US012420565B2

(12) United States Patent
Yoda

(10) Patent No.: US 12,420,565 B2
(45) Date of Patent: Sep. 23, 2025

(54) PRINTING APPARATUS AND CONTROL METHOD FOR PRINTING APPARATUS

(71) Applicant: SEIKO EPSON CORPORATION, Tokyo (JP)

(72) Inventor: Tomohiro Yoda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 302 days.

(21) Appl. No.: 18/174,199

(22) Filed: Feb. 24, 2023

(65) Prior Publication Data

US 2023/0271429 A1 Aug. 31, 2023

(30) Foreign Application Priority Data

Feb. 25, 2022 (JP) ................................. 2022-027691

(51) Int. Cl.
*B41J 11/00* (2006.01)
*B41J 15/16* (2006.01)
*B41J 29/393* (2006.01)

(52) U.S. Cl.
CPC ...... *B41J 11/0005* (2013.01); *B41J 11/00216* (2021.01); *B41J 11/0024* (2021.01); *B41J 11/00242* (2021.01); *B41J 15/16* (2013.01); *B41J 15/165* (2013.01); *B41J 29/393* (2013.01)

(58) Field of Classification Search
CPC .............. B41J 11/0024; B41J 11/00242; B41J 11/00216; B41J 11/00212; B41J 11/0005; B41J 11/02; B41J 11/04; B41J 11/0045; B41J 15/165; B41J 15/16; B41J 29/38; B41J 29/393; B41M 7/009; B65H 18/10; B65H 18/08; B65H 23/04; B65H 23/1806; B65H 23/1813; B65H 23/18; B65H 23/195; B65H 23/1825; B65H 23/1955; B65H 23/198; B65H 2301/517; B65H 2301/5143; B65H 2301/51432; B65H 2404/60; B65H 2404/70; B65H 2220/01; B65H 2220/02; B65H 2515/31; B65H 2801/15
USPC ......... 242/412, 412.2, 413, 413.1, 416, 420; 347/16, 101, 104, 105, 102
See application file for complete search history.

(56) References Cited

U.S. PATENT DOCUMENTS 8,814,313 B2 * 8/2014 Leighton .................. B41J 15/16 347/101
9,616,681 B2 * 4/2017 Hoshino .............. B41J 11/0022
10,308,059 B2 * 6/2019 Sano .................. B41J 11/00244
(Continued)

FOREIGN PATENT DOCUMENTS

JP 2019-30989 A 2/2019

*Primary Examiner* — Leslie J Evanisko
*Assistant Examiner* — Thomas Ray Knief
(74) *Attorney, Agent, or Firm* — WORKMAN NYDEGGER

(57) ABSTRACT

A printing apparatus includes a feeding unit, a conveyance roller, a printing unit, a guide unit, a winding unit, and a control unit. The guide unit includes a heater (first heater) that heats a surface that comes into contact with a printing medium (medium), and applies a tensile force while heating the medium after printing by the first heater. The control unit controls a winding force of the winding unit to adjust the tensile force applied to the printing medium by the guide unit. The control unit performs the control to change the winding force of the winding unit and the heating temperature of the first heater in accordance with the type of the medium, the printing condition during the printing, or the environmental condition.

10 Claims, 5 Drawing Sheets

(56) References Cited

U.S. PATENT DOCUMENTS

| | | | | |
|---|---|---|---|---|
| 11,999,580 | B2 * | 6/2024 | Gracia Verdugo | B41J 15/16 |
| 2019/0039390 | A1 | 2/2019 | Moriya | |
| 2020/0130378 | A1 * | 4/2020 | Kurosawa | B41J 11/00244 |
| 2021/0031510 | A1 * | 2/2021 | Asamoto | B41J 11/0021 |

* cited by examiner

PRINTING APPARATUS AND CONTROL METHOD FOR PRINTING APPARATUS

The present application is based on, and claims priority from JP Application Serial Number 2022-027691, filed Feb. 25, 2022, the disclosure of which is hereby incorporated by reference herein in its entirety.

BACKGROUND

1. Technical Field

The present disclosure relates to a printing apparatus, and a control method for a printing apparatus.

2. Related Art

In the related art, printing apparatuses that perform printing on a medium such as roll paper are known. The printing apparatus performs printing by ejecting ink toward the medium from an ejecting head. Such a printing apparatus is provided with a heater such as a heater for the purpose of drying and fixing the ink ejected to the printed medium so as not to cause cockling due to swelling of the printed medium with the ink.

In the printing apparatus disclosed in JP-A-2019-30989, in view of the problem that the drying of the ink is inhibited when the temperature of the medium is reduced by a contact part making contact with the medium after the printing, a heater is installed at the contact part to suppress the temperature drop of the medium.

While JP-A-2019-30989 has a configuration in which the medium is heated and tension is applied with a guide unit for guiding the medium, it is difficult to appropriately perform drying and winding of the medium in accordance with various conditions (medium type, printing condition, and environmental condition).

SUMMARY

A printing apparatus includes a feeding unit configured to feed a printing medium wound in a roll form, a conveyance roller configured to convey, in a conveyance direction, the printing medium fed from the feeding unit, a printing unit configured to apply a liquid to adhere to the conveyed printing medium to perform printing, a guide unit configured to come into contact with the printing medium to apply a tensile force, a winding unit configured to wind the printing medium after the printing, and a control unit. The feeding unit, the conveyance roller, the printing unit, the guide unit and the winding unit are disposed in this order from upstream in the conveyance direction, the guide unit includes a first heater configured to heat a guide surface being a surface that comes into contact with the printing medium, and applies the tensile force to the printing medium after the printing while heating the printing medium through the guide surface by the first heater, the control unit controls a winding force of the winding unit to adjust the tensile force applied to the printing medium by the guide unit, and the control unit controls the winding unit and the first heater to change the winding force of the winding unit and a heating temperature of the first heater in accordance with a type of the printing medium, a printing condition during the printing, or an environmental condition.

A control method of controlling a printing apparatus, the printing apparatus including a feeding unit configured to feed a printing medium wound in a roll form, a conveyance roller configured to convey, in a conveyance direction, the printing medium fed from the feeding unit, a printing unit configured to apply a liquid to adhere to the conveyed printing medium to perform printing, a guide unit configured to come into contact with the printing medium to apply a tensile force, and a winding unit configured to wind the printing medium after the printing. The feeding unit, the conveyance roller, the printing unit, the guide unit and the winding unit are disposed in this order from upstream in the conveyance direction, the guide unit includes a heater configured to heat a guide surface being a surface that comes into contact with the printing medium, and applies the tensile force to the printing medium after the printing while heating the printing medium through the guide surface by the heater, the printing apparatus adjusts the tensile force to be applied to the printing medium by the guide unit by controlling a winding force of the winding unit, and the printing apparatus controls the winding unit and the heater to change the winding force of the winding unit and a heating temperature of the heater in accordance with a type of the printing medium, a printing condition during the printing, or an environmental condition.

DESCRIPTION OF EXEMPLARY EMBODIMENTS

1. Embodiment

Figure 1:
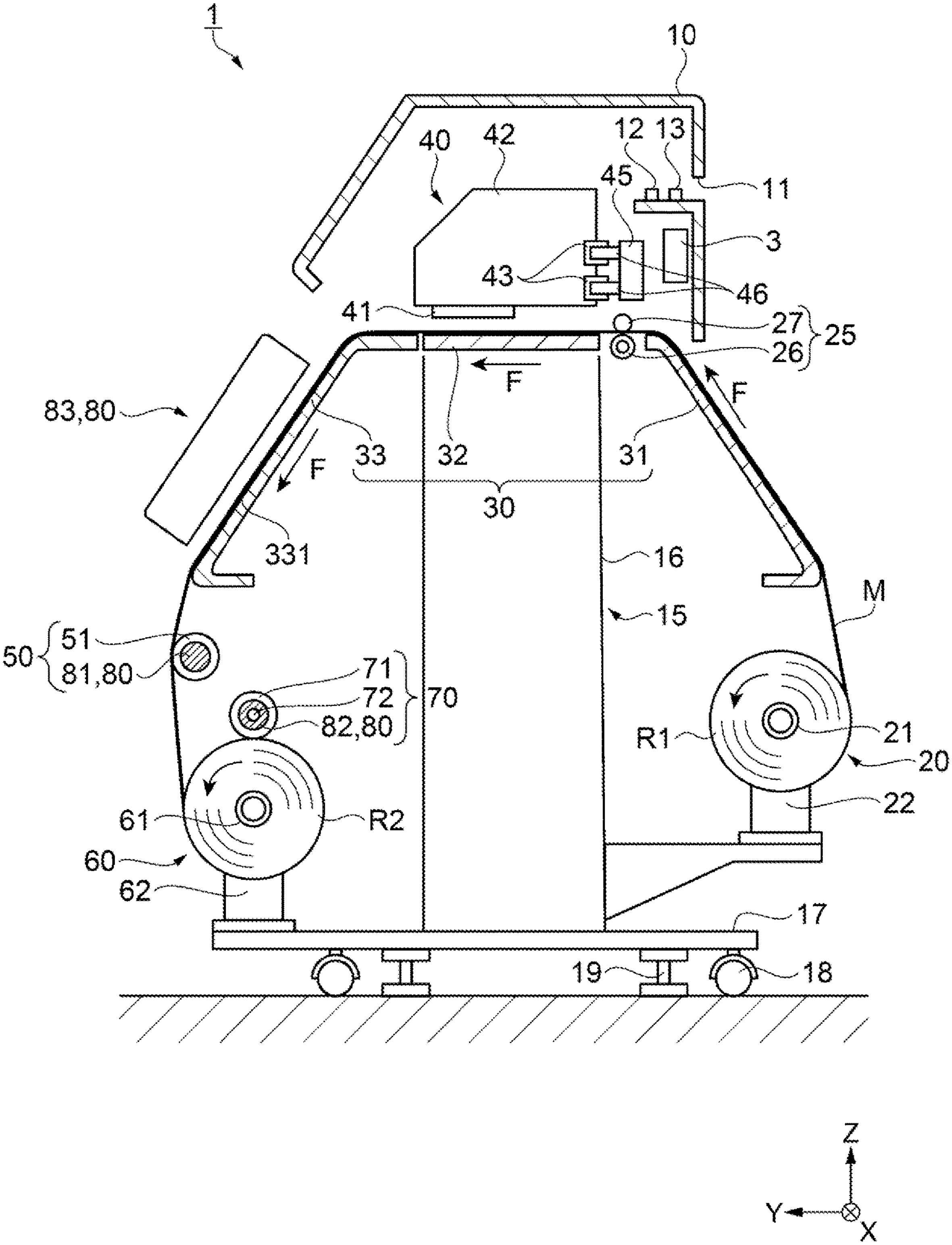
FIG. 1 is a schematic sectional view illustrating a configuration of a printing apparatus according to an embodiment.
Figure 2:
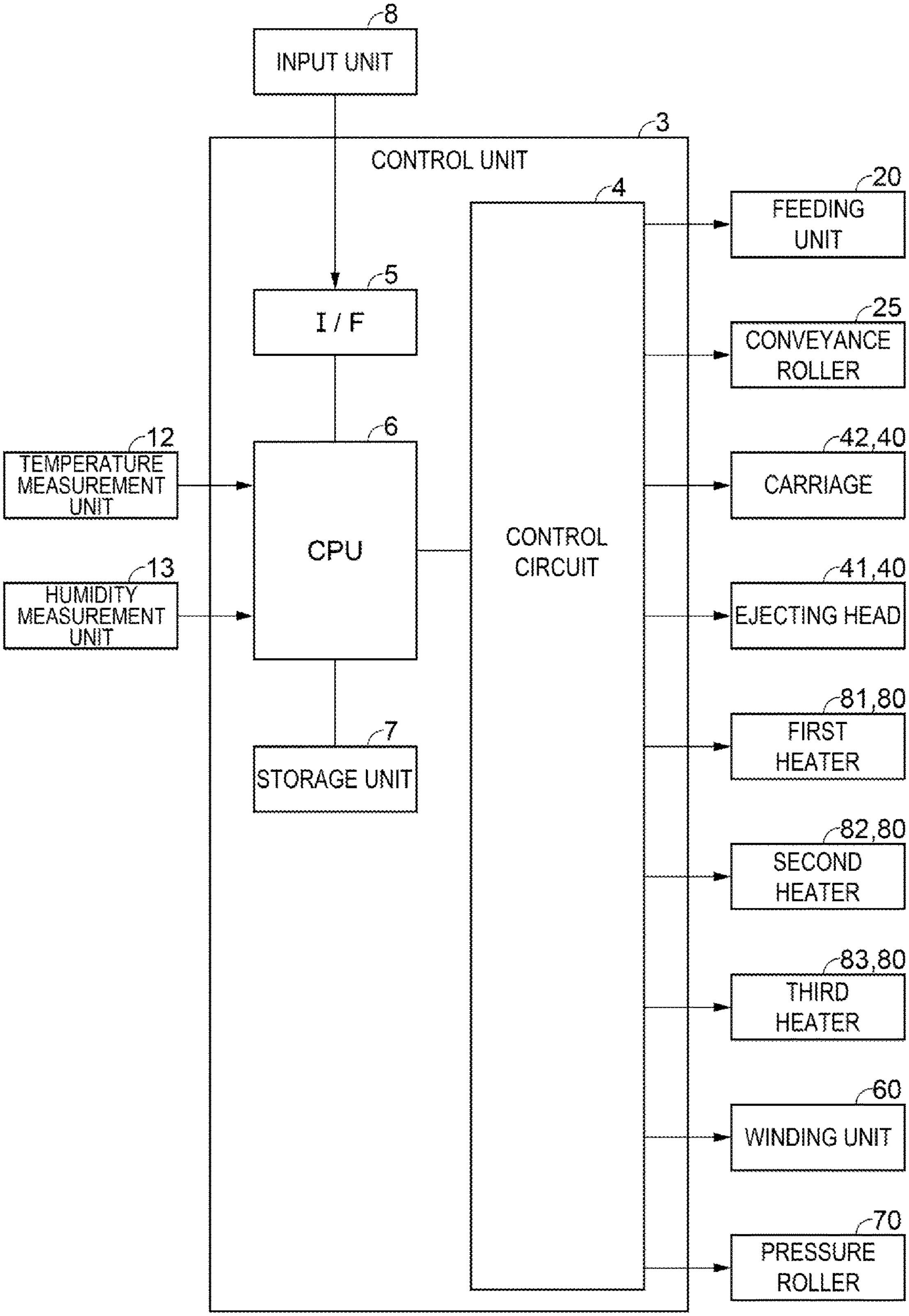
FIG. 2 is a schematic block diagram illustrating an electrical configuration of the printing apparatus.

FIG. 1 is a schematic sectional view illustrating a configuration of a printing apparatus 1 according to this embodiment. FIG. 2 is a schematic block diagram illustrating an electrical configuration of the printing apparatus 1.

As illustrated in FIG. 1, the printing apparatus 1 of this embodiment is a serial-type large format printer (LFP) that handles a long medium M, which is an example of a printing medium (hereinafter referred to as medium M).

Note that an XYZ coordinate system is used for the illustration in FIG. 1. The Z direction is the direction along the gravity direction and the vertical direction. In the following description, the Z direction is also referred to as up-down direction. The X direction crosses (orthogonally, in this embodiment) the up-down direction, and is the longitudinal direction of a housing 10 (the width direction of the medium M). In the following description, the X direction is also referred to as width direction or scanning direction. The Y direction crosses (orthogonally, in this embodiment) both the Z direction (up-down direction) and the X direction (width direction). In the following description, the Y direction is also referred to as front-rear direction.

In the front-rear direction (the Y direction), the front side or front surface side of the printing apparatus 1 is +Y direction, and the rear side or back side is −Y direction. In addition, in the width direction (the X direction) when the printing apparatus 1 is viewed from the front surface side, the left side is +X direction, and the right side is −X direction. In addition, in the up-down direction (the Z direction), the upper side, upward side, upper part, top surface and the like are +Z direction, and the lower side, downward side, lower part, bottom surface and the like are −Z direction.

The medium M is conveyed toward a winding unit 60 from a feeding unit 20 described later. This conveyance direction of the medium M is referred to as conveyance direction F. In addition, when the positional relationship along the conveyance direction F of the medium M is described, the feeding unit 20 side is upstream, and the winding unit 60 side is downstream.

An outline of a configuration of the printing apparatus 1 is described below with reference to FIGS. 1 and 2.

The printing apparatus 1 is composed of a frame 15, the feeding unit 20, a conveyance roller 25, a supporting unit 30, a printing unit 40, a guide unit 50, the winding unit 60, a pressure roller 70, a heater 80, a control unit 3 and the like. As illustrated in FIG. 1, the frame 15 is composed of a base frame 16 extending in the width direction, a pair of leg frames 17 extending in the front-rear direction integrally with the base frame 16 and formed in the width direction to receive the weight of the printing apparatus 1, and the like.

As illustrated in FIG. 1, the frame 15 is composed of a base frame 16 extending in the width direction, a pair of leg frames 17 extending in the front-rear direction integrally with the base frame 16 and formed in the width direction to receive the weight of the printing apparatus 1, and the like. In addition, the first heater 81 and the second heater 82 suppress the cockling by correcting into a flat shape the deformed medium M swelled with ink.

As illustrated in FIG. 1, the feeding unit 20, the conveyance roller 25, the supporting unit 30, the guide unit 50, the pressure roller 70 and the like are fixed to the base frame 16. The winding unit 60 is fixed to the leg frame 17 and the like. The printing unit 40 is installed inside the housing 10 with a substantially cuboid shape elongated in the width direction fixed to the base frame 16. The control unit 3 is provided inside the housing 10 and generally controls the operation of each unit of the printing apparatus 1.

The printing apparatus 1 includes a pair of casters 18 and a pair of adjusters 19 at the lower ends of the pair of leg frames 17 formed in the width direction. The printing apparatus 1 is fixed to the floor surface, for example, after the printing apparatus 1 is moved to an installation position with the caster 18 and the height adjustment (such as horizontal adjustment) of the printing apparatus 1 is performed with the adjuster 19.

The feeding unit 20 is provided at a lower part of the back side of the housing 10. The feeding unit 20 includes a pair of holders 22 that sandwiches both ends of a core tube 21. A roll body R1, composed of the unused medium M for printing wound in a roll form around the core tube 21, is held at the holder 22. A feed motor (omitted in the drawing) that supplies a rotational force to the core tube 21 is provided at one holder 22. When the feed motor is driven into rotation in the feeding direction (in FIG. 1, the counterclockwise direction), the core tube 21 is rotated in a driven manner, and the medium M is fed from the roll body R1 toward the conveyance roller 25. Note that the control unit 3 controls the feeding unit 20 (feed motor).

The roll body R1 of multiple sizes with different widths and number of rolls of the medium M is loaded in a replaceable manner in the feeding unit 20. In addition, the roll body R1 of multiple types with different types (materials) of the medium M is loaded in a replaceable manner in the feeding unit 20.

The supporting unit 30 includes a first supporting unit 31, a platen 32, and a second supporting unit 33. The first supporting unit 31 is provided upstream of the platen 32, and the second supporting unit 33 is provided downstream of the platen 32. The first supporting unit 31 guides the medium M fed from the feeding unit 20 to the platen 32. The second supporting unit 33 guides the medium M printed in the printing unit 40 to the guide unit 50 and the winding unit 60.

The platen 32 is formed with a substantially rectangular surface of which the longitudinal direction is set as the scanning direction, and the platen 32 is installed at a position facing the printing unit 40 (ejecting head 41). The platen 32 supports from below the medium M that is being printed at the printing unit 40. Specifically, the platen 32 suctions and supports the medium M at the top surface of the platen 32 with a negative pressure applied to the platen 32. In this manner, reduction in printing quality due to separation of the medium M is suppressed.

The conveyance roller 25 conveys the medium M fed from the feeding unit 20 in the conveyance direction F. The conveyance roller 25 includes a driving roller 26, a driven roller 27, and a driving motor (omitted in the drawing). The driving roller 26 is provided between the first supporting unit 31 and the platen 32. The driving roller 26 is configured to extend in the direction that intersects the conveyance direction F of the medium M.

The driven roller 27 is fixed on the upper side of the driving roller 26, and is configured to be movable such that it goes away from or makes into pressure contact with the driving roller 26. When the driving motor is driven and the driving roller 26 is driven into rotation, the medium M sandwiched between the driving roller 26 and the driven roller 27 is conveyed in the conveyance direction F. Note that the control unit 3 controls the rotation of the conveyance roller 25 (the driving motor).

The printing unit 40 is disposed facing the platen 32 above the platen 32 downstream of the conveyance roller 25. The printing unit 40 includes the ejecting head 41 that ejects and applies ink as liquid to the medium M supported on the top surface of the platen 32, and a carriage 42 that is movable back and forth in the scanning direction orthogonal to the conveyance direction F of the medium M while supporting the ejecting head 41.

The ejecting head 41 includes a plurality of nozzles (omitted in the drawing), and is configured to be able to eject ink. Specifically, the ejecting head 41 is composed of a plurality of nozzles aligned in the direction orthogonal to the scanning direction. Further, each ejecting head 41 is disposed side by side in the scanning direction for each color. Note that the control unit 3 controls the operation of the ejecting head 41.

The carriage 42 is supported by two carriage shafts 46 extending in the width direction installed in a carriage frame 45 so as to be movable back and forth. The carriage 42 and the carriage shaft 46 of this embodiment are engaged through two bearings 43 fixed to the carriage 42. Further, the carriage 42 moves along the carriage shaft 46 with carriage motor (omitted in the drawing). The bearing 43 is configured as a so-called ball bearing. Note that the control unit 3 controls the operation of the carriage 42 (carriage motor).

In the printing apparatus 1 of this embodiment, dots are formed on the medium M to print a predetermined image on the medium M by alternately repeating an ejecting operation of ejecting ink as ink drops from the ejecting head 41 while moving the ejecting head 41 in the scanning direction (the X direction) and a conveyance operation of conveying the medium M in the conveyance direction F by a predetermined amount with the conveyance roller 25.

Note that this embodiment exemplifies, as the ejecting head 41, an ejecting head of a serial head type that ejects ink while moving in the scanning direction and is mounted in the carriage 42 that moves back and forth. However, the ejecting head 41 may be an ejecting head of a line head type that extends in the scanning direction and ejects ink in a fixed state.

The winding unit 60 is installed downstream of the guide unit 50 described later. The winding unit 60 includes a pair of holders 62 that sandwiches both ends of a core tube 61. A roll body R2, composed of the medium M printed at the printing unit 40 and wound around the core tube 61, is held at the holder 62. A winding motor (omitted in the drawing) that applies a rotational force to the core tube 61 is provided at one holder 62. When the winding motor is driven to rotate in the winding direction (in FIG. 1, the counterclockwise direction), the core tube 61 is rotated in a driven manner, and the medium M past the guide unit 50 is wound around the core tube 61, thus forming the roll body R2.

Note that the winding unit 60 of this embodiment winds up the medium M in synchronization with the conveyance operation of the conveyance roller 25 through the control of the control unit 3. In addition, in accordance with the sending speed of the medium M, the inertia (inertia moment) of the winding unit 60, the type of the medium M described later, the printing condition during the printing, the environmental condition and the like, the torque of the roll body R2 is optimized, and the tensile force of the medium M is adjusted.

The guide unit 50 is installed upstream of the winding unit 60 and downstream of the second supporting unit 33, and guides the printed medium M toward the winding unit 60. The guide unit 50 has a hollow cylindrical shape, and is composed of a cylindrical part 51 longer than the length of the medium M in the width direction and the first heater 81 installed inside the cylindrical part 51. The guide unit 50 is fixed and supported at both end portions of the cylindrical part 51 with a holding unit (omitted in the drawing), and installed in the base frame 16.

The guide unit 50 of this embodiment does not rotate. Further, in the guide unit 50, the guide surface as the front outer peripheral surface of the cylindrical part 51 makes contact with the medium M, and a proper tensile force is given to the medium M after the printing conveyed in the conveyance direction F through the driving of the winding unit 60. Thus, at the guide unit 50, the medium M after the printing is conveyed in a sliding manner while receiving a predetermined tensile force from the front outer peripheral surface of the cylindrical part 51. Note that the cylindrical part 51 of the guide unit 50 makes contact with the surface opposite to the printed surface of the medium M after the printing.

The tensile force to be applied to the medium M by the guide unit 50 is generated by the winding force (rotational force) supplied to the core tube 61 from the winding motor of the winding unit 60. In other words, the control unit 3 adjusts the tensile force to be applied to the medium M by the guide unit 50 by controlling the winding force of the winding unit 60 (specifically, by controlling the winding motor).

The material of the cylindrical part 51 may be aluminum with which the thermal conductivity of the metal member is favorable, for example. In addition, the outer peripheral surface of the aluminum is provided with a surface treatment such as anodic oxidation treatment in order to improve the strength and corrosion resistance, and to improve wearing resistance and smoothness. Thus, the heat generated at the first heater 81 installed inside the cylindrical part 51 can be efficiently transferred to the medium M.

The first heater 81 is an infrared ray heater that performs heating with infrared rays and/or far infrared rays, for example. As the first heater 81, sheathed heaters having a heating element (Nichrome wire) inside, and ceramic heaters using ceramics as a heating element may also be used as well as infrared ray heaters, for example. The first heater 81 is coupled to a heating driving unit (omitted in the drawing) disposed outside the guide unit 50. Through the driving of the heating driving unit, the first heater 81 is heated, and the cylindrical part 51 is heated from the inside of the cylindrical part 51, and thus, the medium M in contact with the outer peripheral surface of the cylindrical part 51 can be heated. The control unit 3 adjusts the heating temperature of the first heater 81 that heats the medium M after the printing by controlling the heating driving unit.

The pressure roller 70 is installed above the roll body R2 of the winding unit 60, and rotates to follow the rotation of the winding unit 60. The pressure roller 70 has a cylindrical shape, and is composed of a roller unit 71 longer than the length of the medium M in the width direction, a rotation shaft 72 that rotates the roller unit 71, and the second heater 82 installed inside the roller unit 71.

In addition, the pressure roller 70 includes a pressure mechanism (omitted in the drawing). The pressure mechanism turnably holds the rotation shaft 72 of the pressure roller 70, rotatably supports both end portions of the roller unit 71, and brings the roller unit 71 into contact with the roll body R2 to press the wound medium M. The control unit 3 can adjust the pressure force to be applied to the roll body R2 by controlling the pressure mechanism.

Specifically, the pressure roller 70 presses the outer peripheral surface of the medium M wound around the winding unit 60. In addition, the pressure roller 70 heats the outer peripheral surface of the medium M with the second heater 82. In this embodiment, the outer peripheral surface of heat the medium M is the surface opposite to the surface heated at the guide unit 50. In this manner, the pressure roller 70 presses the outer peripheral surface of the medium M wound around the winding unit 60 while heating it. Note that in the pressure roller 70, the roller unit 71 rotates to follow the rotation of the winding unit 60. In the following description, the rotation of the roller unit 71 is referred to as the rotation of the pressure roller 70 for convenience of description.

The material of the roller unit 71 may be aluminum with which the thermal conductivity of the metal member is favorable, as with the above-described cylindrical part 51 of the guide unit 50. Likewise, the outer peripheral surface of the aluminum is provided with surface treatments such as anodic oxidation treatment. Thus, the heat generated at the second heater 82 installed inside the roller unit 71 can be efficiently transferred to the medium M.

As with the first heater 81, the second heater 82 is an infrared ray heater that performs heating with infrared rays and/or far infrared rays. As the second heater 82, sheathed heaters having a heating element (Nichrome wire) inside, and ceramic heaters using ceramics as a heating element may also be used as well as infrared ray heaters, for example. The second heater 82 is coupled to the heating driving unit disposed outside the guide unit 50. Through the driving of the heating driving unit, the second heater 82 is heated, and the roller unit 71 is heated from the inside of the roller unit 71, and thus, the medium M in contact with the outer peripheral surface of the roller unit 71 can be heated. Note that the control unit 3 adjusts the heating temperature by controlling the second heater 82 (the heating driving unit). In addition, the control unit 3 adjusts the pressure force by controlling the pressure mechanism.

The third heater 83 is installed facing the second supporting unit 33 that supports the medium M after the printing between the printing unit 40 and the guide unit 50. The third heater 83 is installed facing the second supporting unit 33 that supports the medium M after the printing between the printing unit 40 and the guide unit 50. The third heater 83 is composed of an infrared ray heater, a housing, a duct, a suction fan and the like, although each omitted in the drawing.

The third heater 83 is designed to face the medium M that is being conveyed and supported by the support surface 331 of the second supporting unit 33, and dry and fix the ink by performing the heating from the printing surface side of the medium M. Note that the control unit 3 controls the third heater 83. In this embodiment, the control unit 3 controls the heating temperature of the third heater 83 as an initially set constant temperature.

In the printing apparatus 1, a temperature measurement unit 12 that measures the temperature of the outside air and a humidity measurement unit 13 that measures the humidity of the outside air are installed inside the housing 10 in the vicinity of an opening 11 of the housing 10.

As elaborated later, in this embodiment, the tensile force (the winding force of the winding unit 60) to be applied to the medium M and the heating temperature of the first heater 81 at the guide unit 50 and the pressure force to be applied to the medium M and the heating temperature of the second heater 82 at the pressure roller 70 are controlled by the control unit 3 so as to be changed in accordance with the type of the medium M, the printing condition during the printing, or the environmental condition. In this manner, by applying the tensile force, pressing and heating for the medium M by adjusting the tensile force of the guide unit 50, the pressure force of the pressure roller 70, and the heating temperature of the first heater 81 and the second heater 82, the deformed medium M swelled with ink is corrected into a flat shape, and thus the winding can be performed while suppressing the cockling.

As illustrated in FIG. 2, the printing apparatus 1 includes an input unit 8, and instructions are provided to the control unit 3 by performing setting operation and/or inputting operation. The input unit 8 may be composed of a touch panel display unit or the like. In addition, the input unit 8 may be provided separately from the printing apparatus 1.

The control unit 3 is a control unit for controlling the printing apparatus 1. As illustrated in FIG. 2, an interface (I/F) unit 5 is configured to transmit and receive data between the input unit 8 and the control unit 3. A CPU 6 is a computation processing device for controlling the entire printing apparatus 1. A storage unit 7 is configured to ensure a region for storing programs of the CPU 6 and a work area. The CPU 6 controls each unit, from the feeding unit 20 to the pressure roller 70, through a control circuit 4.

In this embodiment, the storage unit 7 stores various tables. Note that as the tables, a receptive layer table that maps the receptive layer and the heating temperature/pressure, an ejection amount table that maps the ink ejection amount and the heating temperature/pressure, a water vapor pressure difference table that maps the pressure difference of the water vapor and the heating temperature/pressure and the like are stored, for example.

The printing apparatus 1 includes a detector group (omitted in the drawing), and the detector group monitors the state inside the printing apparatus 1. The control unit 3 controls each component on the basis of the detection result of the detector group. Note that the temperature measurement unit 12 and the humidity measurement unit 13 also make up the detector group.

Figure 3:
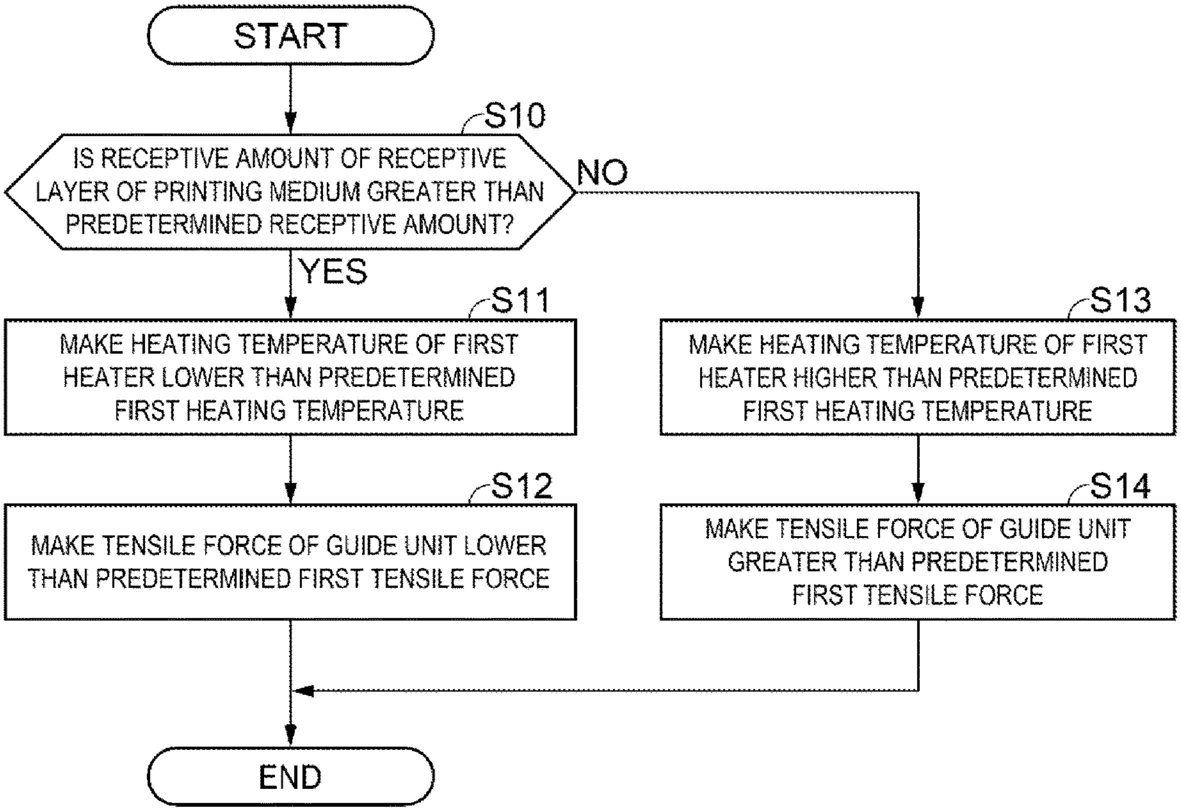
FIG. 3 is a flowchart illustrating an example of a control method for the printing apparatus.

FIG. 3 is a flowchart illustrating an example of a control method of the printing apparatus 1. Specifically, FIG. 3 is a flowchart for controlling the heating temperature of the first heater 81 at the guide unit 50 and the tensile force of the guide unit 50 in accordance with the receptive amount of the receptive layer of the medium M.

As described above, the control unit 3 controls the heating temperature of the first heater 81 at the guide unit 50 and the tensile force of the guide unit 50 in accordance with the receptive amount of the receptive layer of the medium M. Note that the receptive layer is a coating layer provided at the outer surface (printing surface) of the medium M (base material) to fix color materials such as dye and pigment by absorbing ink. By providing the receptive layer at the outer surface (printing surface) of the medium M (base material), when ink is ejected to the medium M, the receptive layer absorbs the ink and prevents the ink from reaching the base material, and thus the cockling can be suppressed.

As illustrated in FIG. 3, the control unit 3 determines whether the receptive amount of the receptive layer of the printing medium (the medium M) is greater than a predetermined receptive amount (step S10). Here, the receptive amount of the receptive layer corresponds to the thickness of a coated receptive layer. In the case where the thickness of the receptive layer is set in accordance with the type of the medium M used, the receptive amount can be set by inputting the type of the medium M used from the input unit 8. Note that the receptive amount may be set by individually inputting the thickness of the receptive layer from the input unit 8.

At step S10, when the receptive amount of the receptive layer of the medium M is greater than the predetermined receptive amount (YES), the control unit 3 makes the heating temperature of the first heater 81 lower than a first heating temperature (step S11). In addition, the control unit 3 makes the tensile force of the guide unit 50 lower than a first tensile force (step S12). Note that as described above, the tensile force of the guide unit 50 is applied by controlling the winding force of the winding unit 60.

The receptive layer table that maps the receptive layer and the heating temperature/pressure is stored in the storage unit 7. The control unit 3 reads a predetermined receptive amount (thickness) set as a reference receptive amount by referring to the receptive layer table, heats the first heater 81 of the guide unit 50 and applies the tensile force such that the first heating temperature corresponding to the reference temperature and the first tensile force corresponding to the reference tensile force are set. Then, the control unit 3 refers to the receptive layer table, and sets the temperature and the tensile force corresponding to the input receptive amount (thickness) of the medium M.

When the receptive amount of the receptive layer of the medium M is greater than the predetermined receptive amount, the receptive layer can absorb the ink ejected to the medium M, thus suppressing the soaking of the ink into the base material and causing less deformation due to the swelling of the medium M, and therefore, it is necessary to prevent excessive heating and excessive tensile force. Therefore, the control unit 3 makes the heating temperature of the first heater 81 lower than the first heating temperature by driving the heating driving unit such that the temperature set by the receptive layer table is set. In addition, at the same time, the control unit 3 makes the tensile force of the guide unit 50 lower than the first tensile force by controlling the winding force of the winding unit 60 by driving the winding motor such that the tensile force set by the receptive layer table is set. In this manner, the medium M can be corrected into a flat shape by applying the proper heating temperature and the proper tensile force to the medium M after the printing. Thus, the winding can be performed while suppressing the cockling and suppressing slack during the winding and the like.

At step S10, when the receptive amount of the receptive layer of the medium M is smaller than the predetermined receptive amount (NO), the control unit 3 makes the heating temperature of the first heater 81 higher than the first heating temperature (step S13). In addition, the control unit 3 makes the tensile force of the guide unit 50 greater than the first tensile force (step S14).

When the receptive amount of the receptive layer of the medium M is smaller than the predetermined receptive amount, all the ink ejected to the medium M cannot be absorbed by the receptive layer, and the soaking of the ink into the base material occurs. Consequently, the medium M tends to be swelled and deformed, and therefore it is necessary to apply higher temperature and greater tensile force. Therefore, the control unit 3 makes the heating temperature of the first heater 81 higher than the first heating temperature by driving the heating driving unit such that the temperature set by the receptive layer table is set. In addition, at the same time, the control unit 3 makes the tensile force of the guide unit 50 greater than the first tensile force by controlling the winding force of the winding unit 60 by driving the winding motor such that the tensile force set by the receptive layer table is set. In this manner, the medium M can be corrected into a flat shape by applying the proper heating temperature and the proper tensile force to the medium M after the printing. Thus, the winding can be performed while suppressing the cockling and suppressing slack during the winding and the like.

Figure 4:
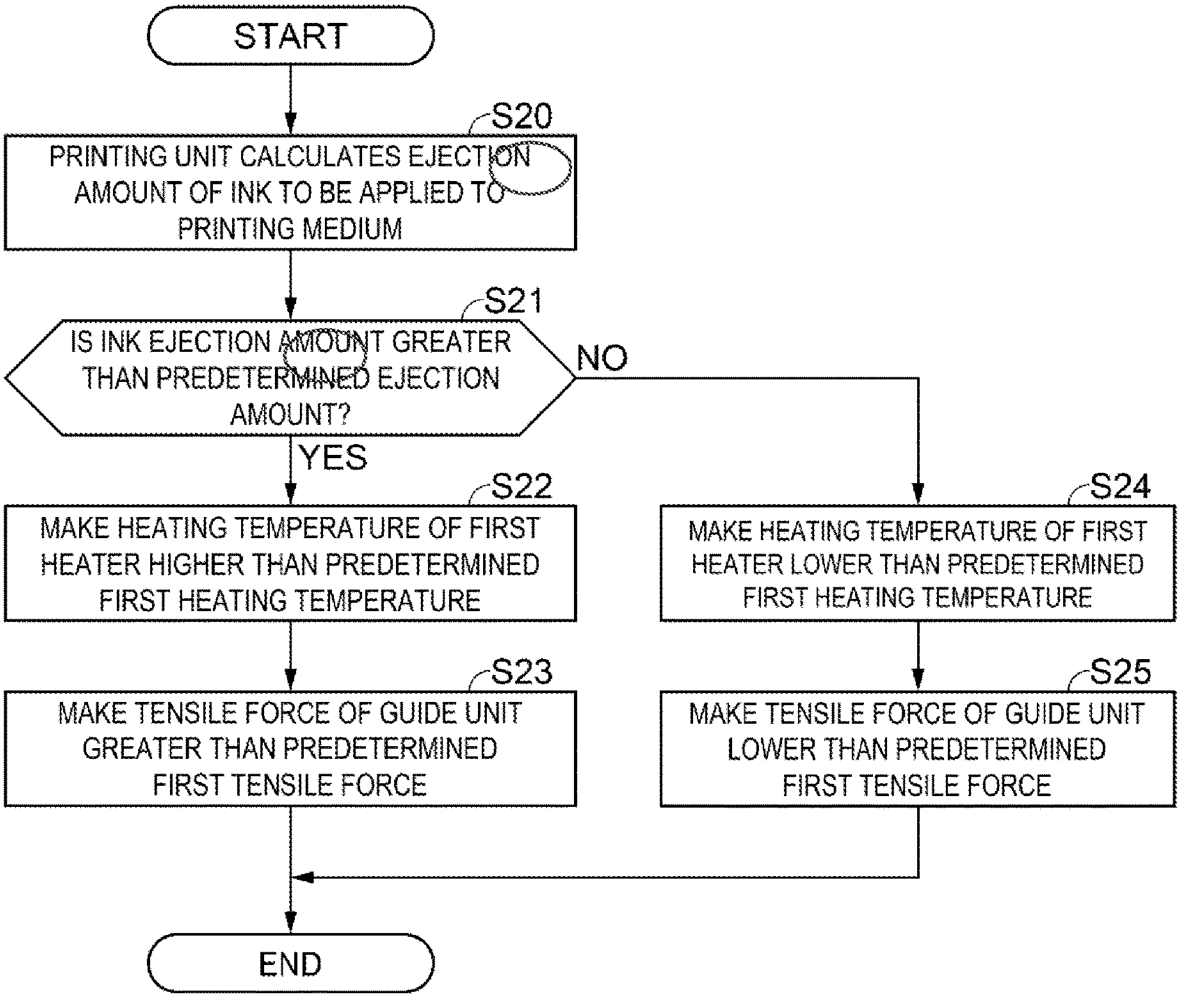
FIG. 4 is a flowchart illustrating an example of a control method for the printing apparatus.

FIG. 4 is a flowchart illustrating an example of a control method of the printing apparatus 1. Specifically, FIG. 4 is a flowchart for controlling the heating temperature of the first heater 81 at the guide unit 50 and the tensile force of the guide unit 50 in accordance with the ejection amount of the ink to be applied to the medium M.

As described above, the control unit 3 controls the heating temperature of the first heater 81 at the guide unit 50 and the tensile force of the guide unit 50 in accordance with the ejection amount of the ink to be applied to the medium M (ejection amount of ink per unit time).

As illustrated in FIG. 4, the control unit 3 calculates the ejection amount of the ink to be applied to the printing medium (the medium M) by the printing unit 40 (the ejecting head 41) (step S20). Specifically, the control unit 3 calculates the total amount of ink to be ejected to the medium M by the ejecting head 41 for the printing of the image on the basis of the image data included in a printing job input for printing. Then, the control unit 3 calculates the ejection amount of ink to be ejected by the ejecting head 41 per unit time when printing the image on the basis of the calculated total amount of ink.

Note that the control unit 3 may calculate the printing duty for the medium M on the basis of image data included in the printing job. In this case, the heating temperature and the tensile force are controlled in accordance with the level of the printing duty.

As illustrated in FIG. 4, at step S20, when the control unit 3 calculates the ejection amount of the ink to be applied to the medium M by the printing unit 40, the control unit 3 then determines whether the ejection amount of the ink to be applied is greater than a predetermined ejection amount (step S21). At step S21, when the ejection amount of the ink to be applied is greater than the predetermined ejection amount (YES), the control unit 3 makes the heating temperature of the first heater 81 higher than the first heating temperature (step S22). In addition, the control unit 3 makes the tensile force of the guide unit 50 greater than the first tensile force (step S23). Note that as described above, the tensile force of the guide unit 50 is applied by controlling the winding force of the winding unit 60.

In the storage unit 7, the ejection amount table that maps the ink ejection amount and the heating temperature/pressure is stored. The control unit 3 reads a predetermined ejection amount of ink initially set as the reference ejection amount by referring to the ejection amount table, heats the first heater 81 of the guide unit 50 and applies the tensile force such that the first heating temperature corresponding to the reference temperature and the first tensile force corresponding to the reference tensile force are set. Then, the control unit 3 refers to the ejection amount table, and sets the temperature and/or tensile force corresponding to the calculated ejection amount of the ink to be applied to the medium M.

When the ejection amount of the ink to be applied to the medium M is greater than the predetermined ejection amount, the deformation due to the swelling of the medium M easily occurs, and it is necessary to apply higher temperature and greater tensile force. Therefore, the control unit 3 makes the heating temperature of the first heater 81 higher than the first heating temperature by driving the heating driving unit such that the temperature set by the ejection amount table is set. In addition, at the same time, the control unit 3 makes the tensile force of the guide unit 50 greater than the first tensile force by controlling the winding force of the winding unit 60 by driving the winding motor such that the tensile force set by the ejection amount table is set. In this manner, by applying the proper heating temperature and the proper tensile force to the medium M after the printing, the medium M swelled with a large amount of ejected ink can be corrected into a flat shape, and the winding can be performed while suppressing the cockling, slack and the like.

At step S21, when the ejection amount of the ink to be applied is smaller than a predetermined ejection amount (NO), the control unit 3 makes the heating temperature of the first heater 81 lower than the first heating temperature (step S24). In addition, the control unit 3 makes the tensile force of the guide unit 50 lower than the first tensile force (step S25).

When the ejection amount of the ink to be applied is smaller than the predetermined ejection amount, the deformation due to the swelling of the medium M less occurs, and therefore, it is necessary to prevent excessive heating and excessive tensile force. Therefore, the control unit 3 makes the heating temperature of the first heater 81 lower than the first heating temperature by driving the heating driving unit such that the temperature set by the ejection amount table is set. In addition, at the same time, the control unit 3 makes the tensile force of the guide unit 50 lower than the first tensile force by controlling the winding force of the winding unit 60 by driving the winding motor such that the tensile force set by the ejection amount table is set. In this manner, by applying the proper heating temperature and the proper tensile force to the medium M after the printing, the medium M can be corrected into a flat shape by preventing excessive heating and excessive tensile force. Thus, the winding can be performed while suppressing the cockling, slack and the like.

Figure 5:
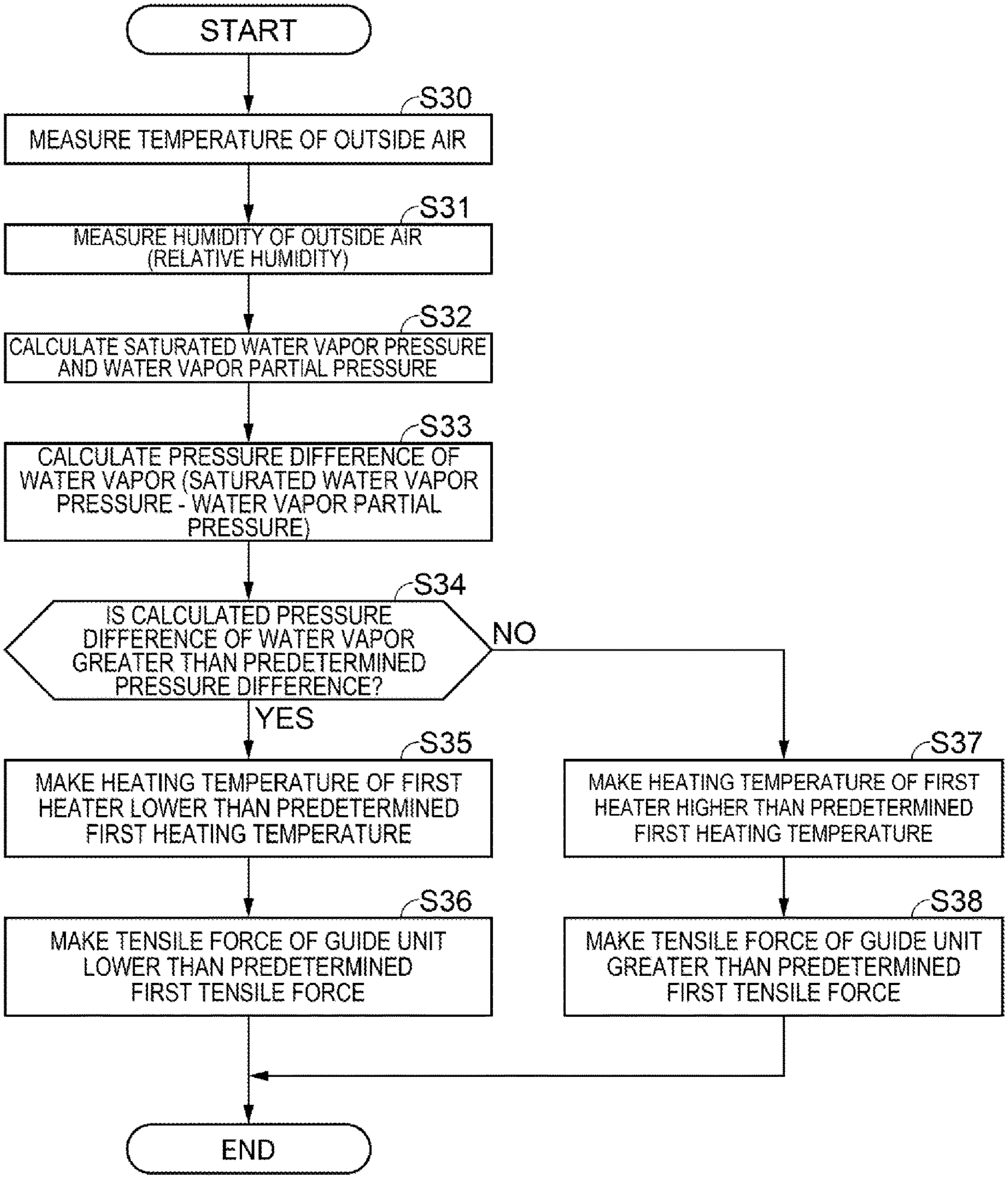
FIG. 5 is a flowchart illustrating an example of a control method for the printing apparatus.

FIG. 5 is a flowchart illustrating an example of a control method of the printing apparatus 1. Specifically, FIG. 5 is a flowchart for controlling the heating temperature of the first heater 81 at the guide unit 50 and the tensile force of the guide unit 50 in accordance with the pressure difference of the water vapor.

The control unit 3 controls the heating temperature of the first heater 81 at the guide unit 50 and the tensile force of the guide unit 50 in accordance with the pressure difference of the water vapor between the surface of the medium M on which ink is adhered and the convection layer facing the surface on the basis of the temperature of the outside air and the humidity of the outside air.

Specifically, the pressure difference of the water vapor is the difference between the saturated water vapor pressure of the surface of the medium M and the water vapor pressure (water vapor partial pressure) of the convection layer facing the surface. The pressure difference of the water vapor is the ease of water vapor diffusion; if the difference is large, drying is easy, and if it is small, drying is difficult.

More specifically, to dry the ink ejected to the medium M, it is necessary that the water in the ink evaporates to become water vapor and move. Then, to allow the water vapor to move, it is necessary to have a pressure difference of the water vapor between the surface of the medium M and the convection layer facing the surface. Note that since the water vapor of the surface of the medium M is saturated, the pressure of the water vapor of the surface is the saturated water vapor pressure. In addition, the water vapor pressure (water vapor partial pressure) of the convection layer facing the surface is proportional to the humidity.

An example of a computational equation for determining the pressure difference of the water vapor is described below.

The saturated water vapor pressure of the surface of the medium M is calculated by applying the temperature of the outside air [° C.] to the computational equation of the saturated water vapor pressure [hPa] of the surface of the medium M. Equation (1) as the computational equation of the saturated water vapor pressure [hPa] is as follows.

Saturated Water Vapor Pressure [hPa]=6.11*10^(7.5*Temperature [° C.]/(237.3+Temperature [° C.])) (1)

In addition, the water vapor partial pressure of the convection layer facing the surface is calculated by multiplying the saturated water vapor pressure [hPa] by the relative humidity [% RH] (multiplication). Equation (2) as the computational equation of the water vapor partial pressure [hPa] of the convection layer is as follows.

Water Vapor Partial Pressure [hPa] of Convection layer=Saturated Water Vapor Pressure [hPa] *Relative Humidity [% RH]/100 (2)

Accordingly, the pressure difference of the water vapor is obtained by subtracting the water vapor partial pressure [hPa] from the saturated water vapor pressure [hPa] (subtraction). Equation (3) as the computational equation of the pressure difference of the water vapor [hPa] is as follows.

Pressure Difference of Water Vapor [hPa]=Saturated Water Vapor Pressure [hPa]−Water Vapor Partial Pressure [hPa] (3)

As illustrated in FIG. 5, the control unit 3 measures the temperature of the outside air (step S30). Specifically, the control unit 3 measures the temperature of the outside air of the printing apparatus 1 with the temperature measurement unit 12. Next, the control unit 3 measures the humidity of the outside air (step S31). Specifically, the control unit 3 measures the relative humidity as the humidity of the outside air of the printing apparatus 1 with the humidity measurement unit 13.

Next, the control unit 3 calculates the saturated water vapor pressure and water vapor partial pressure (step S32). Specifically, first, the control unit 3 calculates the saturated water vapor pressure and the water vapor partial pressure in accordance with the above-described Equations (1) and (2) on the basis of the temperature of the outside air and the humidity of the outside air. Next, the control unit 3 calculates the pressure difference of the water vapor (step S33). Specifically, the control unit 3 calculates the pressure difference of the water vapor in accordance with the above-described Equation (3) on the basis of the saturated water vapor pressure and the water vapor partial pressure.

Next, the control unit 3 determines whether the calculated pressure difference of the water vapor is greater than a predetermined pressure difference (step S34). Note that in this embodiment, for example, the predetermined pressure difference is a pressure difference of the water vapor of 13 [hPa].

At step S34, when the pressure difference of the water vapor is greater than the predetermined pressure difference (YES), the control unit 3 makes the heating temperature of the first heater 81 lower than the first heating temperature (step S35). In addition, the control unit 3 makes the tensile force of the guide unit 50 lower than the first tensile force (step S36). Note that as described above, the tensile force of the guide unit 50 is applied by controlling the winding force of the winding unit 60.

In the storage unit 7, the water vapor pressure difference table that maps the pressure difference of the water vapor and the heating temperature/pressure is stored. The control unit 3 reads, as the predetermined pressure difference, the pressure difference of the water vapor initially set as the reference pressure difference (for example, 13 [hPa]) by referring to the water vapor pressure difference table, heats the first heater 81 of the guide unit 50 and applies the tensile force such that the first heating temperature corresponding to the reference temperature and the first tensile force corresponding to the reference tensile force are set. Then, the control unit 3 refers to the water vapor pressure difference table, and sets the temperature and/or the tensile force corresponding to the calculated pressure difference of the water vapor.

When the pressure difference of the water vapor is greater than the predetermined pressure difference, it dries easily and the deformation due to the swelling of the medium M less occurs, and therefore, it is necessary to prevent excessive heating and excessive tensile force. Therefore, the control unit 3 makes the heating temperature of the first heater 81 lower than the first heating temperature by driving the heating driving unit such that the temperature set by the water vapor pressure difference table is set. In addition, at the same time, the control unit 3 makes the tensile force of the guide unit 50 lower than the first tensile force by controlling the winding force of the winding unit 60 by driving the winding motor such that the tensile force set by the water vapor pressure difference table is set. In this manner, by applying the proper heating and proper tensile force to the medium M after the printing, the medium M can be corrected into a flat shape by preventing excessive heating and excessive tensile force. Thus, the winding can be performed while suppressing the cockling, slack and the like.

At step S34, when the pressure difference of the water vapor is smaller than the predetermined pressure difference (NO), the control unit 3 makes the heating temperature of the first heater 81 higher than the first heating temperature (step S37). In addition, the control unit 3 makes the tensile force of the guide unit 50 greater than the first tensile force (step S38).

When the pressure difference of the water vapor is smaller than the predetermined pressure difference, it dries easily and the deformation due to the swelling of the medium M easily occurs, and therefore, it is necessary to apply higher temperature and greater tensile force. Therefore, the control unit 3 makes the heating temperature of the first heater 81 higher than the first heating temperature by driving the heating driving unit such that the temperature set by the water vapor pressure difference table is set. In addition, at the same time, the control unit 3 makes the tensile force of the guide unit 50 greater than the first tensile force by controlling the winding force of the winding unit 60 by driving the winding motor such that the tensile force set by the water vapor pressure difference table is set. In this manner, by applying the proper heating and proper tensile force to the medium M after the printing, the medium M swelled with ejected ink can be corrected into a flat shape. Thus, the winding can be performed while suppressing the cockling, slack and the like.

According to this embodiment, the following effects can be obtained.

The printing apparatus 1 of this embodiment includes the feeding unit 20, the conveyance roller 25, the printing unit 40, the guide unit 50, the winding unit 60 and the control unit 3. The guide unit 50 includes the first heater 81 as the heater 80 that heats the surface (the outer peripheral surface of the cylindrical part 51) that makes contact with the medium M, and applies a tensile force while heating the medium M after the printing with the first heater 81. In addition, the control unit 3 adjusts the tensile force to be applied to the medium M by the guide unit 50 by controlling the winding force of the winding unit 60. The control unit 3 performs the control to change the winding force of the winding unit 60 and the heating temperature of the first heater 81 in accordance with the receptive layer corresponding to the type of medium M, the ejection amount of the ink to be ejected corresponding to the printing condition during the printing, or the pressure difference of the water vapor corresponding to the environmental condition.

With this configuration, the heating temperature of the guide unit 50 (the first heater 81) and the tensile force of the guide unit 50 (the winding force of the winding unit 60) are controlled in accordance with the type of the medium M, the printing condition during the printing, or the environmental condition, and the medium M on which ink is adhered is heated while applying pressure. Thus, excessive heating and pressing or insufficient heating and pressing can be prevented to perform appropriate heating and pressing, and the medium M swelled with ejected ink can be corrected into a flat shape. Thus, for the printed medium M, slack during the winding and the like can be suppressed while suppressing the cockling, and the medium M can be appropriately wound.

In the printing apparatus 1 of this embodiment, the guide unit 50 makes contact with the surface opposite to the printed surface of the medium M after the printing.

With this configuration, even when the medium M is slid on the outer peripheral surface of the guide unit 50, the printed surface of the medium M can be prevented from being damaged.

The printing apparatus 1 of the winding unit 60 of this embodiment includes the pressure roller 70 that makes contact with the outer peripheral surface of the wound medium M and presses it while following the rotation of the winding unit 60. Further, the pressure roller 70 includes the second heater 82 that heats the outer peripheral surface of the medium M. In addition, the pressure roller 70 presses the medium M wound around the winding unit 60 while heating the medium M from the surface opposite to the surface heated by the guide unit 50.

With this configuration, by pressing and heating the medium M after the printing while following the rotation of the winding unit 60 with the second heater 82 provided in the pressure roller 70, slack during the winding and the like can be further suppressed while suppressing the cockling, and the medium M can be appropriately wound.

The printing apparatus 1 of this embodiment includes the support surface 331 of the second supporting unit 33 that supports the medium M after the printing and the third heater 83 that heats the medium M supported by the support surface 331, between the printing unit 40 and the guide unit 50.

With this configuration, with the third heater 83, excessive heating and pressing or insufficient heating and pressing can be further prevented. Thus, for the printed medium M, the medium M can be appropriately wound while suppressing the cockling.

In the printing apparatus 1 of this embodiment, when the receptive layer of the medium M has the predetermined receptive amount, the control unit 3 sets the heating temperature of the first heater 81 to the first heating temperature, and sets the tensile force to be applied to the guide unit 50 to the first tensile force. When the receptive layer of the medium M is greater than the predetermined receptive amount, the control unit 3 makes the heating temperature of the first heater 81 lower than the first heating temperature, and makes the tensile force lower than the first tensile force. In addition, when the receptive layer of the medium M is smaller than the predetermined receptive amount, the control unit 3 makes the heating temperature of the first heater 81 higher than the first heating temperature, and makes the tensile force greater than the first tensile force.

With this configuration, by controlling the heating temperature of the guide unit 50 (the first heater 81) and the tensile force of the guide unit 50 by the size of the receptive amount for absorbing the ink at the receptive layer of the medium M corresponding to the type of medium M, further appropriate heating and pressing can be performed. Thus, for the printed medium M, slack during the winding and the like can be suppressed while suppressing the cockling, and the medium M can be appropriately wound.

In the printing apparatus 1 of this embodiment, when the ejection amount of the ink to be applied to the medium M by the printing unit 40 is the predetermined ejection amount, the control unit 3 sets the heating temperature of the first heater 81 to the first heating temperature, and sets the tensile force to be applied to the guide unit 50 to the first tensile force. When the ink ejection amount is smaller than the predetermined ejection amount, the control unit 3 makes the heating temperature of the first heater 81 lower than the first heating temperature, and makes the tensile force lower than the first tensile force. In addition, when the ink ejection amount is greater than the predetermined ejection amount, the control unit 3 makes the heating temperature of the first heater 81 higher than the first heating temperature, and makes the tensile force greater than the first tensile force.

With this configuration, by controlling the heating temperature of the guide unit 50 (the first heater 81) and the tensile force of the guide unit 50 by the size of the ejection amount of the ink to be applied to the medium M by the printing unit 40 corresponding to the printing condition during the printing, further appropriate heating and pressing can be performed. Thus, for the printed medium M, slack during the winding and the like can be suppressed while suppressing the cockling, and the medium M can be appropriately wound.

The printing apparatus 1 of this embodiment includes the temperature measurement unit 12 that measures the temperature of the outside air, and the humidity measurement unit 13 that measures the humidity of the outside air (relative humidity). The control unit 3 calculates the pressure difference of the water vapor between the surface of the medium M on which ink is adhered and the convection layer facing the surface on the basis of the measured temperature of the outside air and the relative humidity. In addition, when the pressure difference of the water vapor is the predetermined pressure difference, the control unit 3 sets the heating temperature of the first heater 81 to the first heating temperature, and sets the tensile force to be applied to the guide unit 50 to the first tensile force. When the pressure difference of the water vapor is greater than the predetermined pressure difference, the control unit 3 makes the heating temperature of the first heater 81 lower than the first heating temperature, and makes the tensile force lower than the first tensile force. When the pressure difference of the water vapor is smaller than the predetermined pressure difference, the control unit 3 makes the heating temperature of the first heater 81 higher than the first heating temperature, and makes the tensile force greater than the first tensile force.

With this configuration, by controlling the heating temperature of the guide unit 50 (the first heater 81) and the tensile force of the guide unit 50 by calculating the pressure difference of the water vapor on the basis of the temperature and humidity corresponding to the environmental condition, the temperature and humidity can be centrally controlled, and the heating temperature and tensile force can be appropriately controlled than by individually handling and controlling the temperature and humidity, and thus, the medium M swelled with ejected ink can be corrected into a flat shape. Thus, for the printed medium M, slack during the winding and the like can be suppressed while suppressing the cockling, and the medium M can be appropriately wound.

The control method for the printing apparatus 1 of this embodiment is a control method for the printing apparatus including the feeding unit 20, the conveyance roller 25, the printing unit 40, the guide unit 50 and the winding unit 60. The guide unit 50 includes the first heater 81 that heats the surface (the outer peripheral surface of the cylindrical part 51) that makes contact with the medium M, and applies a tensile force while heating the medium M after the printing with the first heater 81. Then, the tensile force to be applied to the medium M by the guide unit 50 is adjusted by controlling the winding force of the winding unit 60. The winding force of the winding unit 60 and the heating temperature of the first heater 81 are controlled to change in accordance with the receptive layer corresponding to the type of medium M, the ejection amount of the ink to be ejected corresponding to the printing condition during the printing, or the pressure difference of the water vapor corresponding to the environmental condition.

With this method, the heating temperature of the guide unit 50 (the first heater 81) and the tensile force of the guide unit 50 (the winding force of the winding unit 60) are controlled in accordance with the type of the medium M, the printing condition during the printing, or the environmental condition, and the medium M on which ink is adhered is heated while applying pressure, and thus, excessive heating and pressing or insufficient heating and pressing can be prevented to perform appropriate heating and pressing. Thus, for the printed medium M, slack during the winding and the like can be suppressed while suppressing the cockling, and the medium M can be appropriately wound.

2. Modification 1

In the embodiment, the heating temperature of the first heater 81 at the guide unit 50 and the tensile force (the winding force of the winding unit 60) at the guide unit 50 (the cylindrical part 51) are adjusted in accordance with the receptive amount of the receptive layer of the medium M. However, this is not limitative, and the heating temperature of the second heater 82 at the pressure roller 70 and the pressure force at the pressure roller 70 (the roller unit 71) may be adjusted in accordance with the receptive amount of the receptive layer of the medium M.

The following describes an example case of performing the adjustment by controlling the pressure force and the heating temperature of the second heater 82 at the pressure roller 70 in accordance with the receptive amount of the receptive layer of the medium M.

When the receptive layer of the medium M has the predetermined receptive amount, the control unit 3 sets the heating temperature of the second heater 82 to the second heating temperature, and sets the pressure force to be applied by the pressure roller 70 to the first pressure force. Then, when the receptive layer of the medium M is greater than the predetermined receptive amount, the control unit 3 makes the heating temperature lower than the second heating temperature, and makes the pressure force lower than the first pressure force. When the receptive layer of the medium M is smaller than the predetermined receptive amount, the control unit 3 makes the heating temperature higher than the second heating temperature, and makes the pressure force greater than the first pressure force.

Note that for the pressure roller 70, the storage unit 7 may store the receptive layer table representing the relationship between the receptive layer and the heating temperature/pressure. In addition, the specific control method may be performed in a similar manner such that in the flowchart illustrated in FIG. 3, the first heater 81 and the first heating temperature are replaced with the second heater 82 and the second heating temperature, and that the guide unit 50, the tensile force, and the first tensile force are replaced with the pressure roller 70, the pressure force, and the first pressure force. Note that the pressure force is adjusted by driving the pressure mechanism.

In this manner, as in the embodiment, the heating and pressing can be appropriately performed by controlling the heating temperature of the pressure roller 70 (the second heater 82) and the pressure force of the pressure roller 70 by the size of the receptive amount for absorbing the ink at the receptive layer of the medium M corresponding to the type of medium M. Thus, slack during the winding and the like can be suppressed while suppressing the cockling, and the medium M can be appropriately wound.

3. Modification 2

In the embodiment, the heating temperature of the first heater 81 at the guide unit 50 and the tensile force (the winding force of the winding unit 60) at the guide unit 50 (the cylindrical part 51) are adjusted in accordance with the ejection amount of the ink to be applied to the medium M by the printing unit 40. In the embodiment, the heating temperature of the first heater 81 at the guide unit 50 and the tensile force (the winding force of the winding unit 60) at the guide unit 50 (the cylindrical part 51) are adjusted in accordance with the ejection amount of the ink to be applied to the medium M by the printing unit 40.

The following describes an example case of performing the adjustment by controlling the heating temperature of the second heater 82 at the pressure roller 70 and the pressure force of the pressure roller 70 in accordance with the ejection amount of the ink to be applied to the medium M by the printing unit 40.

When the ejection amount of the ink to be applied to the medium M by the printing unit 40 is the predetermined ejection amount, the control unit 3 sets the heating temperature of the second heater 82 to the second heating temperature, and sets the pressure force to be applied by the pressure roller 70 to the first pressure force. When the ink ejection amount is smaller than the predetermined ejection amount, the control unit 3 makes the heating temperature lower than the second heating temperature, and makes the pressure force lower than the first pressure force. In addition, when the ink ejection amount is greater than the predetermined ejection amount, the control unit 3 makes the heating temperature higher than the second heating temperature, and makes the pressure force greater than the first pressure force.

Note that for the pressure roller 70, the storage unit 7 may store the ejection amount table representing the relationship between the ink ejection amount and the heating temperature/pressure. In addition, the specific control method may be performed in a similar manner such that in the flowchart illustrated in FIG. 4, the first heater 81 and the first heating temperature are replaced with the second heater 82 and the second heating temperature, and that the guide unit 50, the tensile force, and the first tensile force are replaced with the pressure roller 70, the pressure force, and the first pressure force. Note that the pressure force is adjusted by driving the pressure mechanism.

In this manner, as in the embodiment, the heating and pressing can be appropriately performed by controlling the heating temperature of the pressure roller 70 (the second heater 82) and the pressure force of the pressure roller 70 by the size of the ejection amount of the ink to be applied to the medium M by the printing unit 40 corresponding to the printing condition during the printing. Thus, slack during the winding and the like can be suppressed while suppressing the cockling, and the medium M can be appropriately wound.

4. Modification 3

In the embodiment, the heating temperature of the first heater 81 at the guide unit 50 and the tensile force (the winding force of the winding unit 60) at the guide unit 50 (the cylindrical part 51) are adjusted in accordance with the pressure difference of the water vapor between the surface of the medium M on which ink is adhered and the convection layer facing the surface. However, this is not limitative, and the heating temperature of the second heater 82 at the pressure roller 70 and the pressure force at the pressure roller 70 (the roller unit 71) may be adjusted in accordance with the pressure difference of the water vapor.

The following describes an example case of performing the adjustment by controlling the pressure force and the heating temperature of the second heater 82 at the pressure roller 70 in accordance with the pressure difference of the water vapor between the surface of the medium M on which ink is adhered and the convection layer facing the surface.

The printing apparatus 1 includes the temperature measurement unit 12 that measures the temperature of the outside air and the humidity measurement unit 13 that measures the humidity of the outside air. The control unit 3 calculates the pressure difference of the water vapor between the surface of the medium M on which ink is adhered and the convection layer facing the surface on the basis of the measured temperature and humidity of the outside air. In addition, when the pressure difference of the water vapor is the predetermined pressure difference, the control unit 3 sets the heating temperature of the second heater 82 to the second heating temperature, and sets the pressure force to be applied by the pressure roller 70 to the first pressure force. When the pressure difference of the water vapor is greater than the predetermined pressure difference, the control unit 3 makes the heating temperature of the second heater 82 lower than the second heating temperature, and makes the pressure force lower than the first pressure force. When the pressure difference of the water vapor is smaller than the predetermined pressure difference, the control unit 3 makes the heating temperature of the second heater 82 higher than the second heating temperature, and makes the pressure force greater than the first pressure force.

Note that for the pressure roller 70, the storage unit 7 may store the water vapor pressure difference table representing the relationship between the pressure difference of the water vapor and the heating temperature/pressure. In addition, the specific control method may be performed in a similar manner such that in the flowchart illustrated in FIG. 5, the first heater 81 and the first heating temperature are replaced with the second heater 82 and the second heating temperature, and that the guide unit 50, the tensile force, and the first tensile force are replaced with the pressure roller 70, the pressure force, and the first pressure force. Note that the pressure force is adjusted by driving the pressure mechanism.

In this manner, as in the embodiment, the temperature and humidity can be centrally controlled by controlling the heating temperature of the pressure roller 70 (the second heater 82) and the pressure force of the pressure roller 70 by calculating the pressure difference of the water vapor on the basis of the temperature and humidity corresponding to the environmental condition, and the heating temperature and the pressure force can be controlled more appropriately than by individually handling and controlling the temperature and humidity. Thus, slack during the winding and the like can be suppressed while suppressing the cockling, and the medium M can be appropriately wound.

5. Modification 4

In the embodiment, the heating temperature of the first heater 81 at the guide unit 50 and the tensile force at the guide unit 50 (the cylindrical part 51) are adjusted in accordance with the receptive amount of the receptive layer of the medium M, the ejection amount of the ink to be applied to the medium M by the printing unit 40, or the pressure difference of the water vapor. In addition, in Modifications 1, 2 and 3, as in the embodiment, the heating temperature of the second heater 82 at the pressure roller 70 and the pressure force at the pressure roller 70 (the roller unit 71) are adjusted in accordance with the receptive amount of the receptive layer of the medium M, the ejection amount of the ink to be applied to the medium M by the printing unit 40, or the pressure difference of the water vapor. However, the control may be performed not only by individually controlling the tensile force and the heating temperature of the guide unit 50 and the heating temperature and pressure force of the pressure roller 70 in accordance with the above-mentioned various conditions, but also by achieving (all) various conditions with a high level of balance within a predetermined heating temperature range, a predetermined tensile force range, and a predetermined pressure force range for the heating temperature, tensile force, pressure force of the guide unit 50 and the pressure roller 70, respectively.

In this manner, the cockling can be suppressed and the medium M can be appropriately and reliably wound.

6. Modification 5

In the embodiment, the heating temperature of the first heater 81 at the guide unit 50 and the tensile force of the guide unit 50 (the winding force of the winding unit 60) are changed in accordance with the receptive amount of the receptive layer of the medium M corresponding to the type of medium M, the ejection amount of the ink to be applied to the medium M by the printing unit 4 corresponding to the printing condition during the printing, or the pressure difference of the water vapor corresponding to the environmental condition. However, this is not limitative, and the control unit 3 may perform the control to change the heating temperature of the first heater 81 at the guide unit 50 and the tensile force of the guide unit 50 (the winding force of the winding unit 60) in accordance with the type of medium M, the printing condition and the environmental condition other than the receptive amount of the receptive layer, the ejection amount of the ink, and the pressure difference of the water vapor. Note that the same applies to the pressure roller 70.

7. Modification 6

In the embodiment, the first heater 81 is installed inside the cylindrical part 51 of the guide unit 50. However, this is not limitative, and the first heater 81 may be installed at the outer peripheral surface of the cylindrical part 51 opposite to the outer peripheral surface where the medium M makes contact and slides. In this manner, the first heater 81 can apply heat to the medium M by transferring heat to the cylindrical part 51 from the outer peripheral surface side.

8. Modification 7

In the embodiment, the third heater 83 is installed facing the second supporting unit 33 that supports the medium M after the printing between the printing unit 40 and the guide unit 50. The third heater 83 faces the medium M that is being conveyed and supported by the support surface 331 of the second supporting unit 33, and heats the medium M from the printing surface side. However, this is not limitative, and the third heater 83 may be installed at the surface opposite to the support surface 331 of the second supporting unit 33. In this case, the third heater 83 may be composed of a sheet-like heater, for example. The sheet-like heater is composed with a heating element such as a metal foil sandwiched inside a sheet member such as a flexible synthetic resin, and generates heat with a substantially uniform temperature distribution. In this manner, the third heater 83 may apply heat to the medium M by transferring heat to the second supporting unit 33 from the surface opposite to the support surface 331 of the second supporting unit 33.

9. Modification 8

In the embodiment, the pressure roller 70 includes the pressure mechanism for pressing the roller unit 71 to bring it into contact with the roll body R2. However, this is not limitative, and the roll body R2 may be pressed by the own weight of the roller unit 71 of the pressure roller 70 without using the pressure mechanism. In this case, the pressure force of the pressure roller 70 is substantially constant.

10. Modification 9

In the embodiment, the first heating temperature of the first heater 81 at the guide unit 50 and the first tensile force (the winding force of the winding unit 60) of the guide unit 50 are set in accordance with the type of the medium M, the printing condition during the printing, or the environmental condition. The first heating temperature encompasses the same value and different values in each condition. Likewise, the first tensile force encompasses the same value and different values in each condition.

What is claimed is:

1. A printing apparatus, comprising:

a feeding unit configured to feed a printing medium wound in a roll form;

a conveyance roller configured to convey, in a conveyance direction, the printing medium fed from the feeding unit;

a printing unit configured to apply a liquid to adhere to the conveyed printing medium to perform printing;

a guide unit configured to come into contact with the printing medium to apply a tensile force;

a winding unit configured to wind the printing medium after printing; and a control unit, wherein the feeding unit, the conveyance roller, the printing unit, the guide unit, and the winding unit are disposed in this order from upstream in the conveyance direction, the guide unit includes a first heater configured to heat a guide surface being a surface that comes into contact with the printing medium, and applies the tensile force to the printing medium after the printing while heating the printing medium through the guide surface by the first heater, the control unit controls a winding force of the winding unit to adjust the tensile force applied to the printing medium by the guide unit, the control unit controls the winding unit and the first heater to change the winding force of the winding unit and a heating temperature of the first heater in accordance with a type of the printing medium, a printing condition during printing, or an environmental condition, when a receptive amount of a receptive layer of the printing medium is a predetermined receptive amount, the control unit sets the heating temperature of the first heater to a first heating temperature, and sets the tensile force applied by the guide unit to a first tensile force, when the receptive amount of the receptive layer of the printing medium is greater than the predetermined receptive amount, the control unit makes the heating temperature lower than the first heating temperature, and makes the tensile force lower than the first tensile force, and when the receptive amount of the receptive layer of the printing medium is smaller than the predetermined receptive amount, the control unit makes the heating temperature higher than the first heating temperature, and makes the tensile force greater than the first tensile force.

2. The printing apparatus according to claim 1, wherein the guide surface comes into contact with a surface on an opposite side of the printing medium from one surface on which printing was performed.

3. The printing apparatus according to claim 1, comprising a pressure roller configured to press an outer peripheral surface of the printing medium wound by the winding unit, wherein the pressure roller includes a second heater configured to heat the outer peripheral surface, and the pressure roller performs pressing while heating the printing medium wound by the winding unit.

4. The printing apparatus according to claim 1, comprising:

a support surface configured to support, between the printing unit and the guide unit, the printing medium after the printing; and a third heater configured to heat the printing medium supported by the support surface.

5. The printing apparatus according to claim 1, comprising:

a temperature measurement unit configured to measure a temperature of outside air; and a humidity measurement unit configured to measure a humidity of the outside air, wherein the control unit calculates a pressure difference of water vapor between one surface of the printing medium on which the liquid is adhered and a convection layer facing the one surface, based on the temperature and the humidity of the outside air measured, when the pressure difference of the water vapor is a predetermined pressure difference, the control unit sets the heating temperature of the first heater to a first heating temperature, and sets the tensile force applied by the guide unit to a first tensile force, when the pressure difference of the water vapor is greater than the predetermined pressure difference, the control unit makes the heating temperature lower than the first heating temperature, and makes the tensile force lower than the first tensile force, and when the pressure difference of the water vapor is smaller than the predetermined pressure difference, the control unit makes the heating temperature higher than the first heating temperature, and makes the tensile force greater than the first tensile force.

6. A printing apparatus, comprising:

a feeding unit configured to feed a printing medium wound in a roll form;

a conveyance roller configured to convey, in a conveyance direction, the printing medium fed from the feeding unit;

a printing unit configured to apply a liquid to adhere to the conveyed printing medium to perform printing;

a guide unit configured to come into contact with the printing medium to apply a tensile force;

a winding unit configured to wind the printing medium after printing; and a control unit, wherein the feeding unit, the conveyance roller, the printing unit, the guide unit, and the winding unit are disposed in this order from upstream in the conveyance direction, the guide unit includes a first heater configured to heat a guide surface being a surface that comes into contact with the printing medium, and applies the tensile force to the printing medium after the printing while heating the printing medium through the guide surface by the first heater, the control unit controls a winding force of the winding unit to adjust the tensile force applied to the printing medium by the guide unit, the control unit controls the winding unit and the first heater to change the winding force of the winding unit and a heating temperature of the first heater in accordance with a type of the printing medium, a printing condition during printing, or an environmental condition, when an ejection amount of the liquid applied to adhere to the printing medium by the printing unit is a predetermined ejection amount, the control unit sets the heating temperature of the first heater to a first heating temperature, and sets the tensile force applied by the guide unit to a first tensile force, when the ejection amount of the liquid is smaller than the predetermined ejection amount, the control unit makes the heating temperature lower than the first heating temperature, and makes the tensile force lower than the first tensile force, and when the ejection amount of the liquid is larger than the predetermined ejection amount, the control unit makes the heating temperature higher than the first heating temperature, and makes the tensile force greater than the first tensile force.

7. The printing apparatus according to claim 6, wherein the guide surface comes into contact with a surface on an opposite side of the printing medium from one surface on which printing was performed.

8. The printing apparatus according to claim 6, comprising a pressure roller configured to press an outer peripheral surface of the printing medium wound by the winding unit, wherein the pressure roller includes a second heater configured to heat the outer peripheral surface, and the pressure roller performs pressing while heating the printing medium wound by the winding unit.

9. The printing apparatus according to claim 6, comprising:

a support surface configured to support, between the printing unit and the guide unit, the printing medium after the printing; and a third heater configured to heat the printing medium supported by the support surface.

10. A control method of controlling a printing apparatus, the printing apparatus comprising a feeding unit configured to feed a printing medium wound in a roll form; a conveyance roller configured to convey, in a conveyance direction, the printing medium fed from the feeding unit; a printing unit configured to apply a liquid to adhere to the conveyed printing medium to perform printing; a guide unit configured to come into contact with the printing medium to apply a tensile force; a winding unit configured to wind the printing medium after printing; wherein the feeding unit, the conveyance roller, the printing unit, the guide unit, and the winding unit are disposed in this order from upstream in the conveyance direction, the guide unit includes a heater configured to heat a guide surface being a surface that comes into contact with the printing medium, and applies the tensile force to the printing medium after the printing while heating the printing medium through the guide surface by the heater, the method comprising:

controlling a winding force of the winding unit to adjust the tensile force applied to the printing medium by the guide unit;

controlling the winding unit and the heater to change the winding force of the winding unit and a heating temperature of the heater in accordance with a type of the printing medium, a printing condition during printing, or an environmental condition;

when a receptive amount of a receptive layer of the printing medium is a predetermined receptive amount, setting the heating temperature of the heater to a first heating temperature, and setting the tensile force applied by the guide unit to a first tensile force, when the receptive amount of the receptive layer of the printing medium is greater than the predetermined receptive amount, setting the heating temperature lower than the first heating temperature, and setting the tensile force lower than the first tensile force; and when the receptive amount of the receptive layer of the printing medium is smaller than the predetermined receptive amount, setting the heating temperature higher than the first heating temperature, and setting the tensile force greater than the first tensile force.

* * * * *